(12) United States Patent
Wang et al.

(10) Patent No.: US 11,406,121 B2
(45) Date of Patent: Aug. 9, 2022

(54) METHOD OF SMART RICE COOKERS CAPABLE OF MIXED GRAIN COOKING AND ABNORMAL CONDITIONS DETECTION

(71) Applicant: MIDEA GROUP CO., LTD., Foshan (CN)

(72) Inventors: Dongyan Wang, San Jose, CA (US); Linnan Zhu, Shenzhen (CN); Xiaochun Li, San Ramon, CA (US); Junyang Zhou, Shenzhen (CN)

(73) Assignee: MIDEA GROUP CO., LTD., Foshan (CN)

( * ) Notice: Subject to any disclaimer, the term of this patent is extended or adjusted under 35 U.S.C. 154(b) by 574 days.

(21) Appl. No.: 15/760,841

(22) PCT Filed: Mar. 8, 2018

(86) PCT No.: PCT/CN2018/078474
§ 371 (c)(1),
(2) Date: Mar. 16, 2018

(87) PCT Pub. No.: WO2019/169613
PCT Pub. Date: Sep. 12, 2019

(65) Prior Publication Data
US 2019/0274337 A1    Sep. 12, 2019

(51) Int. Cl.
*A23L 5/10*    (2016.01)
*A47J 36/32*    (2006.01)
(Continued)

(52) U.S. Cl.
CPC ............... *A23L 5/13* (2016.08); *A47J 36/32* (2013.01); *A47J 36/321* (2018.08);
(Continued)

(58) Field of Classification Search
CPC ............... A23L 5/10; A47J 36/32; G06K 9/62
See application file for complete search history.

(56) References Cited

U.S. PATENT DOCUMENTS

2010/0068333 A1* 3/2010 Qvyjt ............... A23K 50/42
426/2
2013/0330088 A1   12/2013 Oshima et al.
(Continued)

FOREIGN PATENT DOCUMENTS

CN    104042124 A    9/2014
CN    104246375 A    12/2014
(Continued)

OTHER PUBLICATIONS

PCT International Search Report and Written Opinion, PCT Application No. PCT/CN2018/078474, dated Nov. 30, 2018, 9 pages.

*Primary Examiner* — Anthony J Weier
(74) *Attorney, Agent, or Firm* — Morgan, Lewis & Bockius LLP

(57) ABSTRACT

A rice cooker assembly uses machine learning models to identify and classify content in grain mixtures thereby to provide better automation of the cooking process. As one example, a rice cooker has a chamber storing grains. A camera is positioned to view an interior of the chamber. The camera captures images of the contents of the chamber. From the images, the machine learning model determines whether the contents of the chamber includes one type or multiple types of grain or whether the contents of the chamber includes any inedible objects. The machine learning model further classifies the one or more types of grains and inedible objects if any. The cooking process may be controlled accordingly. The machine learning model may be resident in the rice cooker or it may be accessed via a network.

13 Claims, 5 Drawing Sheets

(51) Int. Cl.
  *G06K 9/62*    (2022.01)
  *H04N 5/232*   (2006.01)
  *G06V 20/68*   (2022.01)

(52) U.S. Cl.
  CPC ........ *G06K 9/6277* (2013.01); *A23V 2002/00* (2013.01); *G06K 9/6262* (2013.01); *G06V 20/68* (2022.01); *H04N 5/232* (2013.01)

(56) References Cited

U.S. PATENT DOCUMENTS

| | | | |
|---|---|---|---|
| 2014/0026762 A1 | 1/2014 | Riefenstein | |
| 2015/0068409 A1* | 3/2015 | Tanaka | A47J 27/004 |
| | | | 99/348 |
| 2015/0228062 A1* | 8/2015 | Joshi | G06F 16/583 |
| | | | 382/110 |
| 2015/0285512 A1* | 10/2015 | Matarazzi | H04N 1/00045 |
| | | | 99/341 |
| 2016/0192446 A1* | 6/2016 | Seddik | H05B 6/6447 |
| | | | 219/705 |
| 2016/0364613 A1 | 12/2016 | Kuroyama et al. | |
| 2017/0074522 A1 | 3/2017 | Cheng | |
| 2017/0223782 A1* | 8/2017 | Imai | H05B 6/6441 |

FOREIGN PATENT DOCUMENTS

| | | |
|---|---|---|
| CN | 204181433 U | 3/2015 |
| CN | 104473556 A | 4/2015 |
| CN | 205758285 U | 12/2016 |
| CN | 205831689 U | 12/2016 |
| CN | 106304453 A | 1/2017 |
| CN | 107440475 A | 12/2017 |
| CN | 107536436 A | 1/2018 |
| CN | 107550234 A | 1/2018 |
| CN | 107669101 A | 2/2018 |
| CN | 107728515 A | 2/2018 |
| CN | 107736794 A | 2/2018 |
| DE | 202012005257 U1 | 8/2012 |
| JP | 2016166724 A | 9/2016 |
| WO | WO 2017170318 A1 | 10/2017 |

* cited by examiner

METHOD OF SMART RICE COOKERS CAPABLE OF MIXED GRAIN COOKING AND ABNORMAL CONDITIONS DETECTION

BACKGROUND

1. Technical Field

This disclosure relates generally to control of cooking appliances such as rice cookers.

2. Description of Related Art

Rice is a staple food source. For health and/or taste reasons, many people prefer to mix rice with other ingredients. Rice mixture with different ingredients require different cooking environment. However, conventional rice cookers do not provide users with controls to cook different rice mixtures to their optimal taste. The users may be able to select the cooking mode such as white rice, brown rice, or quick cook, but not much more. Once set, the rice cooker blindly carries out the user's instructions, without regard to what rice mixture is being cooked, whether the user's selections will produce the optimal taste of the rice mixture, or whether the rice mixture is over- or under-cooked at the end of the cooking time. In addition, conventional rice cookers cannot detect impurities such as pest, small stones, sand, small pieces of metal, husks, etc. that spoil the food and may be detrimental to users' health. Thus, there is a need for more intelligent rice cookers.

SUMMARY

The present disclosure provides rice cookers that use machine learning models to identify and classify grain mixtures. As one example, a rice cooker has a storage chamber storing grains. A camera is positioned to view an interior of the storage chamber. The camera captures images of the contents of the storage chamber. From the images, the machine learning model determines whether the contents of the storage chamber contain one or multiple types of food (e.g., grain) or whether the food is mixed with inedible objects. The machine learning model further classifies the identified food or inedible objects. The cooking process may be controlled accordingly. The machine learning model may be resident in the rice cooker or it may be accessed via a network.

This process may be used to set the initial cooking process for the rice cooker, including selection of the proper cooking mode and setting the temperature-time curve for cooking. It may also be used to automatically adjust the cooking process as cooking progresses. Control of the cooking process can also be based on user inputs, temperature sensing, historical performance data and other factors.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
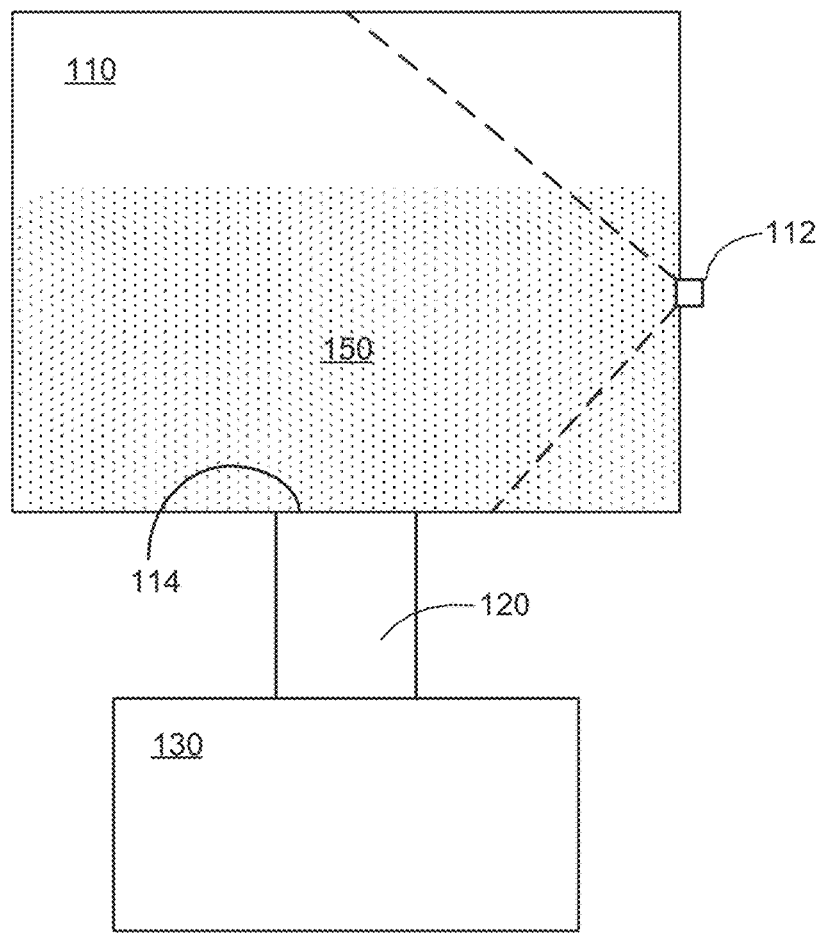
FIG. 1 is a cross-section of a side view of a rice cooker assembly, according to an embodiment.

FIG. 1 is a cross-section of a side view of a rice cooker assembly 100 according to an embodiment. The rice cooker assembly 100 includes a storage chamber 110, a conduit 120, and a cooking chamber 130. Food 150 is placed in the storage chamber 110 for storage. The storage chamber 110 is made of transparent materials such as glass or acrylic, that are preferably anti-scratch. The storage chamber 110 includes a gate 114. Opening the gate 114 creates an opening on a bottom support of the storage chamber 110. The opening allows the food 150 to pass through. The conduit 120 allows the food 150 to be moved from the storage chamber 110 to the cooking chamber 130 for cooking. The food includes grains such as white rice, brown rice, long-grain rice, short-grain rice, medium-grain rice, wheat berries, cereals, legumes, millets, Job's tears, corn, barleys, oats, rye, spelt, wild rice, amaranth, buckwheat, chia, quinoa, chickpeas, peas, fava beans, lentils, mung beans, lima beans, peanuts, pigeon peas, mung beans, soybeans, black beans, red beans, lotus seeds, and/or any combination thereof. The food can further include fresh fruits, dried fruits, nuts, spices, and/or any combination thereof.

The rice cooker assembly 100 includes a camera 112 positioned to view the interior of the storage chamber 110. In the illustrated example, the camera 112 is located on a side wall of the storage chamber 110. The camera 112 is positioned on an exterior surface of the side wall of the storage chamber 110. The camera's field of view is shown by the dashed lines. In other embodiments, the camera 112 is located on a bottom support of the storage chamber 110. For example, the camera 112 is located on the exterior surface of the bottom support. The exterior surface may include an optical coating to reduce reflection thereby allowing the camera to capture better quality images. The camera can take colored pictures of the contents (e.g., the food 150) of the storage chamber 110. In further embodiments, the camera 112 or an additional camera is positioned to view the interior of the cooking chamber 130.

The rice cooker assembly 100 may include a cooking chamber 130 where the food 150 is cooked. Before cooking the food 150, the conduit 120 and the storage chamber 110 can be detached and separated from the cooking chamber 130. The cooking chamber 130 can be connected to a water source (not sown) such as a water tank. The water source can be a part of the rice cooker assembly 100. In some embodiments, the cooking chamber 130 includes a scale for measuring an amount of food to be cooked.

Figure 2:
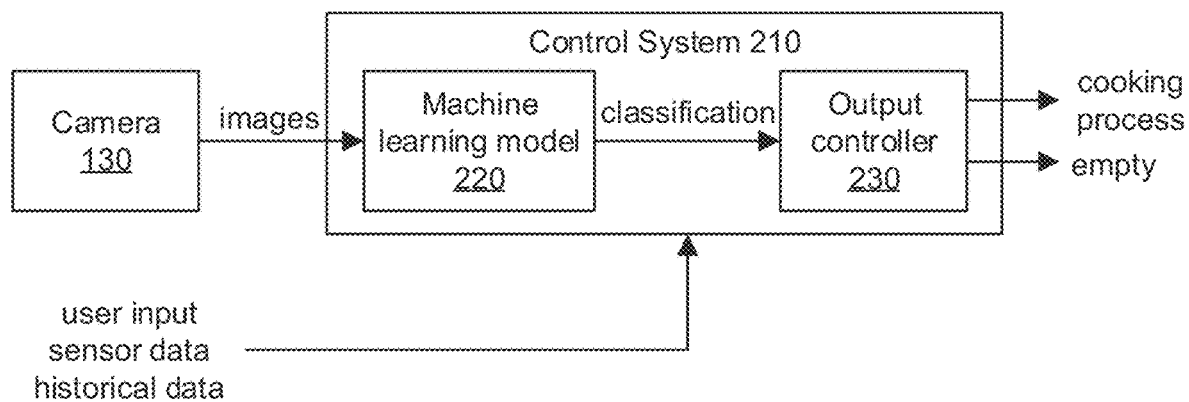
FIG. 2 is a block diagram illustrating control of a rice cooker, according to an embodiment.

FIG. 2 is a block diagram illustrating control of the rice cooker assembly 100. The control system 210 is roughly divided into one or more machine learning models 220 and an output controller 230. The machine learning model(s) 220 receives images captured by the camera 112.

From these inputs (possibly in combination with other additional inputs), the machine learning model 220 determines the contents in the storage chamber 110. Preferably, it identifies and classifies the food 150 from the images. For example, it identifies whether the food 150 includes multiple food components and classifies the food components. The machine learning model 220 may determine a ratio between different food components. A food component refers to a particular type of food. As another example, it identifies whether the food 150 includes inedible objects and classifies the inedible objects. For an identified inedible object, the machine learning model 220 can determine a 3D position of the inedible object. Different types of grains will be cooked differently, including using different temperatures and times as well as different water amounts. When mixed with other types of non-grains food such as nuts or fruits, the cooking requirement for the mixture may further vary. Moreover, different users may have different preferences for textures (e.g., firmness, stickiness, etc.). Some people prefer a more chewy texture whereas others prefer a softer texture.

The output controller 230 controls the cooking process for the food according to the identification and classification determined by the machine learning model 220. One aspect controlled by the output controller 230 typically is the temperature-time curve for cooking the food 150. Based at least on the classified one or more types of food component, the controller 230 can select the right temperature and the right cooking time. The right temperature and the right cooking time may also be selected based on the amount of the food to be cooked. Furthermore, rather than cooking at a constant temperature for a certain amount of time (e.g., boiling for 20 minutes), the controller may specify a temperature-time curve that varies the temperature as a function of time. The controller 230 may further select a water amount cooking the food.

The controller 230 may also take other factors into consideration, such as user inputs, or temperature monitoring of the cooking chamber or of the food. The user's preference of texture (e.g., stickiness, firmness) will influence the temperature-time curve. In addition, the cooking can be actively monitored based on monitoring the temperature of the cooking chamber or of the food. For example, if a thermometer indicates the mixture has reached the correct internal temperature, the controller may end the cooking process even if the allotted cooking time has not been reached.

In addition to the temperature-time curve, the controller 230 may also adjust other quantities. For example, if the rice cooker has different cooking modes, the controller 230 may select the correct cooking mode for the detected type(s) of food components. Examples of cooking modes include white rice, brown rice, and mixed rice. More sophisticated cooking modes are possible. For example, the white rice cooking mode may be subdivided into white rice with a firmness level and/or a stickiness level that each can be selected from a range. If the cooking process has different phases, such as soaking, pre-heating, boiling, finishing, and keeping warm, the controller 230 may determine when to transition from one phase to the next. The controller can also provide notification when the cooking process is completed.

In addition to controlling the cooking process, the control system 210 controls whether the storage chamber 110 should be emptied according to the identification and classification determined by the machine learning model 220. For example, if an inedible object is detected in the food 150, the output controller 230 determines that the storage chamber 110 should be emptied. For example, the output controller 230 generates a signal to open the gate 114. Example inedible objects include pests, sand particles, small stones, small metals, husks, etc. The output controller 230 may generate a warning signal to alert users about the inedible object in addition to or instead of emptying the storage chamber 110. It may also provide notification if the storage chamber is empty.

Figure 3:
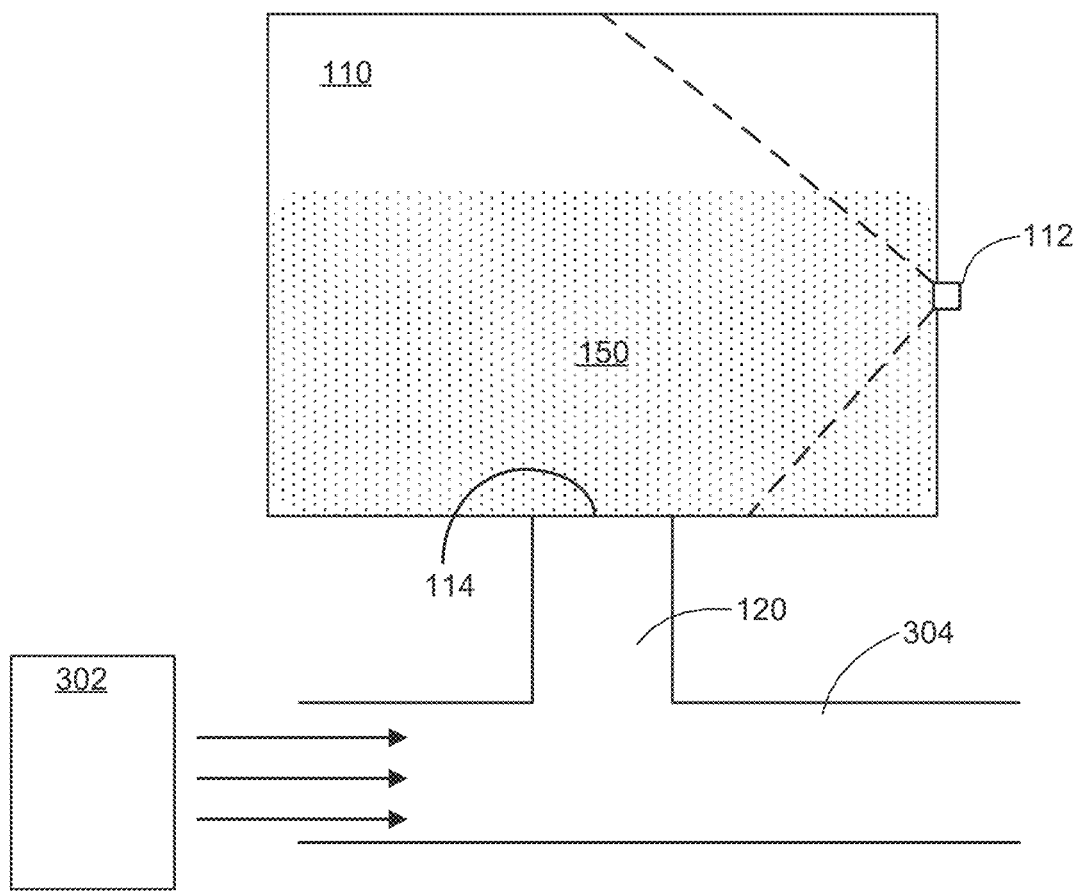
FIG. 3 is a cross-section of a side view of an assembly, according to an embodiment.

FIG. 3 is a cross-section of a side view of an assembly 300 according to an embodiment. The assembly 300 includes the storage chamber 110, camera 112, and a conduit 120, all of which have been described in connection with FIG. 1 and description of which is omitted herein. The assembly 300 further includes a second conduit 304 and a blowing machine 302. The second conduit 304 can be attached to the conduit 120 before emptying the storage chamber 110. As illustrated, the second conduit 304 is connected to the conduit 120 such that the passage of the second conduit 304 is vertical to the passage of the conduit 120. The blowing machine 32 is positioned at one end of the conduit 304. When emptying the storage chamber 110, the blowing machine 32 blows air into the passage of the conduit 304. The arrows indicate a direction of the air flow. The gate 114 is opened to allow the food 150 to enter into the passage of the conduit 304 via the passage of the conduit 120. The airflow pushes the food towards the other end of the conduit 304. After emptying the storage chamber 110, the second conduit 304 can be detached from the conduit 120 and removed.

Figure 4A:
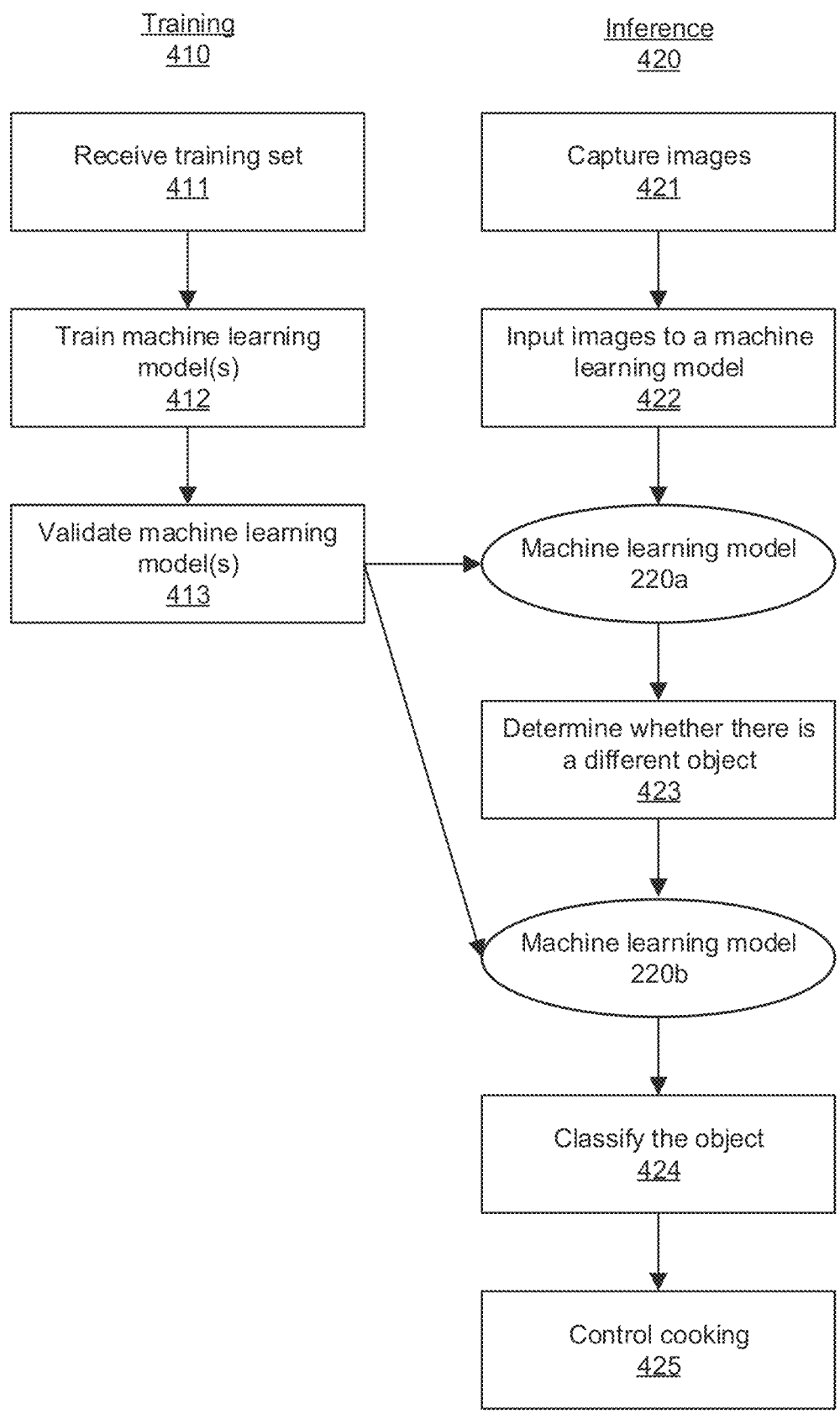
FIG. 4A is a flow diagram illustrating training and operation of a machine learning model, according to an embodiment.

FIG. 4A is a flow diagram illustrating training and operation of one or more machine learning models 220, according to an embodiment. The process includes two main phases: training 410 the machine learning model(s) 220 and inference (operation) 420 of the machine learning model(s) 220. A letter after a reference numeral, such as "220a," indicates that the text refers specifically to the element having that particular reference numeral, while a reference numeral in the text without a following letter, such as "220," refers to any or all of the elements in the figures bearing that reference numeral.

A training module (not shown) performs training 410 of the machine learning model(s) 220. In some embodiments, a machine learning model 220 is defined by an architecture with a certain number of layers and nodes, with biases and weighted connections (parameters) between the nodes. In one example, the machine learning model 220 includes a Convolutional Neural Network (CNN) based machine learning model. The CNN based machine learning model may be based on structures such as yolo (you only look once), faster RCNN (Region-based Convolutional Neural Networks), and SSD (Single Shot MultiBox Detector). During training 410, the training module determines the values of parameters (e.g., weights and biases) of the machine learning model 220, based on a set of training samples.

Figure 4C:
FIG. 4C illustrates an example pre-processed image, according to an embodiment.
Figure 4B:
FIG. 4B illustrates an example training sample, according to an embodiment.

The training module receives 411 a training set for training. The training samples in the set includes images captured by the camera 112 for many different situations: different types of food, different inedible objects, different mixtures of food, different mixtures of food and inedible objects, different lighting conditions, etc. For supervised learning, the training set typically also includes tags for the images. The tags include the attributes to be trained: types of food components, types of inedible objects, a ratio between food components, etc. In some embodiments, the training module applies a back propagation algorithm to optimize the model parameters. The training module may apply the stochastic gradient descending method to update the model parameters. One training sample is illustrated in FIG. 4B. The training sample is a picture of rice mixed with a bug.

In typical training 412, a training sample is presented as an input to a machine learning model 220, which then produces an output for a particular identification and/or for a particular classification. One or multiple machine learning models can be used to identify whether the food includes different types of food components, to classify each identified food component, to identify whether the food includes inedible objects, and/or to classify each identified inedible object. The difference between the machine learning model's output and the known good output is used by the training module to adjust the values of the parameters in the machine learning model 220. This is repeated for many different training samples to improve the performance of the machine learning model 220.

The training module typically also validates 413 the trained machine learning model 220 based on additional validation samples. For example, the training module applies the machine learning model 220 to a set of validation samples to quantify the accuracy of the machine learning model 220. The validation sample set includes images and their known attributes. The output of the machine learning model 220 can be compared to the known ground truth. Common metrics applied in accuracy measurement include Precision=TP/(TP+FP) and Recall=TP/(TP+FN), where TP is the number of true positives, FP is the number of false positives and FN is the number of false negatives. Precision is how many outcomes the machine learning model 220 correctly predicted had the target attribute (TP) out of the total that it predicted had the target attribute (TP+FP). Recall is how many outcomes the machine learning model 220 correctly predicted had the attribute (TP) out of the total number of validation samples that actually did have the target attribute (TP+FN). The F score (F-score=2*Precision*Recall/(Precision+Recall)) unifies Precision and Recall into a single measure Common metrics applied in accuracy measurement also include Top-1 accuracy and Top-5 accuracy. Under Top-1 accuracy, a trained model is accurate when the top-1 prediction (i.e., the prediction with the highest probability) predicted by the trained model is correct. Under Top-5 accuracy, a trained model is accurate when one of the top-5 predictions (e.g., the five predictions with highest probabilities) is correct.

The training module may use other types of metrics to quantify the accuracy of the trained model. In one embodiment, the training module trains the machine learning model until the occurrence of a stopping condition, such as the accuracy measurement indication that the trained model is sufficiently accurate, or a number of training rounds having taken place.

Training 410 of the machine learning model 220 preferably occurs off-line, as part of the product development for the rice cookers. The trained model 220 is then installed on the rice cookers sold to consumers. A rice cooker can execute the machine learning model using fewer computing resources than is required for training. In some cases, the machine learning model 220 is continuously trained 410 or updated. For example, the training module uses the images captured by the camera 112 in the field to further train the machine learning model 220. Because the training 410 is more computationally intensive, it may be cloud-based or occur on a separate home device with more computing power. Updates to the machine learning model 220 are distributed to the rice cookers.

In operation 420, the machine learning model 220a uses the images captured 421 by the camera 112 as input 422. The machine learning model 220a determines 423 whether the food 150 includes one or more other food components or inedible objects in addition to a food component. If the machine learning model 220a determines the food 150 includes multiple food components or an inedible object, the machine learning model 220b uses the images captured 421 by the camera 112 as input.

The machine learning model 220b classifies the food component(s) and the inedible objects (if any). In one architecture, the machine learning model 220b calculates 424 a probability of possible different outcomes, for example the probability that the object is a certain type of grain, a certain type of non-grain food, a certain type of inedible object, etc. Based on the calculated probabilities, the machine learning model 220 identifies 424 which classification is most likely. For example, the machine learning model 220 might identify that mung bean is the most likely grain type. In a situation where there is not a clear cut winner, the machine learning model 220 may identify multiple classifications and ask the user to verify. For example, it might report that mung beans and red beans are both likely, with the user verifying which one. The machine learning models 220a and 220b can be one same machine learning model, or sub-models of an ensemble machine learning model.

The controller 230 then controls 425 the rice cooker based on the classification.

In some embodiments, raw images captured by the camera 112 may be pre-processed to enhance contrast before being input to the machine learning models 220. For example, linear variation algorithm, exponential variation algorithm, histogram variation algorithm and the like image processing mechanisms can be applied. By doing this, image features can be rendered more obvious thereby to improve the accuracy in the machine learning model's output. FIG. 4C illustrates an example image captured by the camera 112 after being pre-processed. As illustrated, the size, shape, surface texture, and other features of each individual grain is accentuated after the image is being pre-processed.

Figure 5:
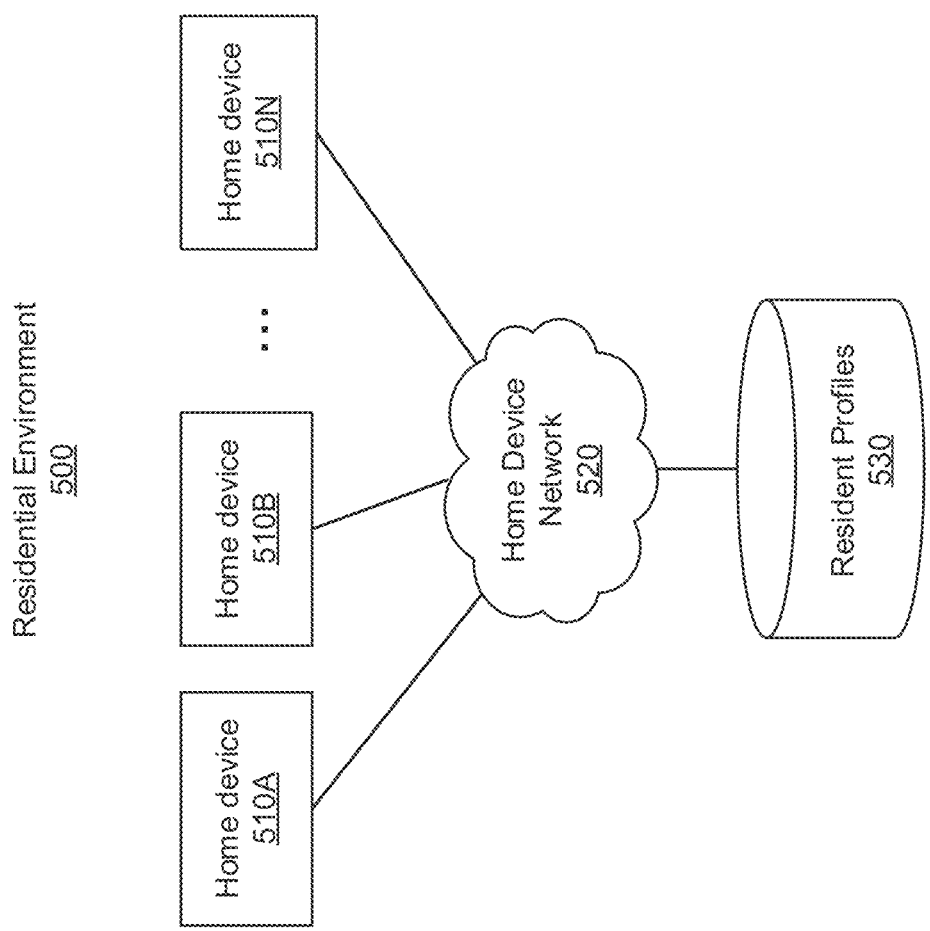
FIG. 5 is a block diagram of a residential environment that includes a rice cooker, according to an embodiment.

In another aspect, the rice cooker may be part of a home network. FIG. 5 is a block diagram of a residential environment that includes a rice cooker, according to an embodiment. The residential environment 500 is an environment designed for people to live in. The residential environment 500 can be a dwelling, such as a house, a condo, an apartment, or a dormitory. The residential environment 500 includes home devices 510A-N, including the rice cookers described above. It also includes a home device network 520 connecting the home devices 510, and a resident profiles database 530 that contains residents' preferences for the home devices. The components in FIG. 5 are shown as separate blocks but they may be combined depending on the implementation. For example, the resident profiles 530 may be part of the home devices 510. Also, the residential environment 500 may include a hub for the network 520. The hub may also control the home devices 510. The network 520 preferably also provides access to external devices, such as cloud-based services.

The home devices 510 are household devices that are made available to the different persons associated with the residential environment 500. Examples of other home devices 510 include HVAC devices (e.g., air conditioner, heater, air venting), lighting, powered window and door treatments (e.g., door locks, power blinds and shades), powered furniture or furnishings (e.g., standing desk, recliner chair), audio devices (e.g., music player), video device (e.g., television, home theater), environmental controls (e.g., air filter, air freshener), kitchen appliances (e.g., rice cooker, coffee machine, refrigerator), bathroom appliances, and household robotic devices (e.g., vacuum robot, robot butler). The home devices 510 can include other types of devices that can be used in a household.

The resident profiles 530 typically include information about the different residents, such as name, an identifier used by the system, age, gender, and health information. The resident profiles 530 can also include settings and other preferences of the home devices 510 selected by the different residents.

The network 520 provides connectivity between the different components of the residential environment 500 and allows the components to exchange data with each other. The term "network" is intended to be interpreted broadly. It can include formal networks with standard defined protocols, such as Ethernet and InfiniBand. In one embodiment, the network 520 is a local area network that has its network equipment and interconnects managed within the residential environment 500. The network 520 can also combine different types of connectivity. It may include a combination of local area and/or wide area networks, using both wired and/or wireless links. Data exchanged between the components may be represented using any suitable format. In some embodiments, all or some of the data and communications may be encrypted.

The functionality described above can be physically implemented in the individual rice cooker (one of the home devices 510), in a hub, in a cloud-based service or elsewhere accessible by the rice cooker via the network 520.

Although the detailed description contains many specifics, these should not be construed as limiting the scope of the invention but merely as illustrating different examples. It should be appreciated that the scope of the disclosure includes other embodiments not discussed in detail above. For example, although a rice cooker is used as the primary example, other cooking appliances such as steamers or microwave ovens can also be used. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for controlling a rice cooker, comprising:

capturing, using a camera positioned within the rice cooker, an image of an interior of a chamber of the rice cooker, the chamber containing food content including at least one food component;

providing the captured image as a first input to a first machine learning model, in a control system of the rice cooker, the first machine learning model configured to determine whether the food content includes only a first food component or multiple food components including the first food component and one or more objects different from the first food component;

responsive to determining by the first machine learning model that the food content includes multiple food components including the first food component and one or more objects different from the first food component, applying the captured image as a second input to a second machine learning model in the control system of the rice cooker that is distinct from the first machine learning model, wherein the second machine learning model is configured to determine each of the one or more objects and the first food component of the food content, and wherein the second machine learning model is configured to identify at least one of the one or more objects mixed within the first food component in the rice cooker as an inedible object; and controlling the rice cooker by controlling a cooking process of the rice cooker according to the determined first food component and the determined one or more objects different from the first food component.

2. The computer-implemented method of claim 1, further comprising:

responsive to determining, by the first machine learning model, that the food content includes multiple food components including the first food component and the one or more objects different from the first food component, controlling a cooking process according to the determined first food component and the determined one or more objects different from the first food component.

3. The computer-implemented method of claim 1, further comprising:
responsive to determining, by the second machine learning model, that at least one of the one or more objects mixed within the first food component as the inedible object, emptying contents of the chamber.

4. The computer-implemented method of claim 2, wherein controlling the cooking process comprises controlling a temperature-time curve for the rice cooker according to the determined first food component and the one or more objects.

5. The computer-implemented method of claim 2, wherein the rice cooker has different cooking modes, and controlling the cooking process comprises selecting a cooking mode according to the determined first food component and the one or more objects.

6. The computer-implemented method of claim 2, wherein the cooking process has different phases, and controlling the cooking process comprises transitioning between different phases according to the determined first food component and the one or more objects.

7. The computer-implemented method of claim 2, further comprising:
determining a ratio between the first food component and the one or more objects, wherein the cooking process is controlled further according to the ratio.

8. The computer-implemented method of claim 2, further comprising:
receiving a user input about content in the chamber or the cooking process, wherein the cooking process is controlled further according to the user input.

9. The computer-implemented method of claim 2, further comprising:
accessing a user's profile for information about content in the chamber or the cooking process, wherein the cooking process is controlled further according to the information from the user's profile.

10. The computer-implemented method of claim 2, further comprising:
accessing historical data for the rice cooker, wherein the cooking process is controlled further according to the historical data.

11. The method of claim 1, wherein the chamber is separate from the rice cooker.

12. The method of claim 1, wherein the rice cooker includes the chamber.

13. The method of claim 1, wherein the camera is located on a side wall of the chamber.

* * * * *